US007903686B2

(12) United States Patent
Sakai (10) Patent No.: US 7,903,686 B2
(45) Date of Patent: Mar. 8, 2011

(54) CONNECTED DEVICE TO BE CONNECTED TO AN IEEE 1394 SERIAL BUS

(75) Inventor: Hiroki Sakai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 951 days.

(21) Appl. No.: 11/755,447

(22) Filed: May 30, 2007

(65) Prior Publication Data

US 2007/0280139 A1    Dec. 6, 2007

(30) Foreign Application Priority Data

May 30, 2006   (JP) ................................. 2006-149656

(51) Int. Cl.
*H04J 3/16*   (2006.01)
(52) U.S. Cl. .............. 370/468; 370/254; 370/477; 710/8
(58) Field of Classification Search ........................ None
See application file for complete search history.

(56) References Cited

U.S. PATENT DOCUMENTS

| | | | | |
|---|---|---|---|---|
| 5,504,757 A | * | 4/1996 | Cook et al. ..................... | 370/468 |
| 6,233,637 B1 | * | 5/2001 | Smyers et al. ................. | 710/311 |
| 6,728,821 B1 | * | 4/2004 | James et al. ................... | 710/306 |
| 6,738,816 B1 | * | 5/2004 | Momona ........................ | 709/226 |
| 6,754,184 B2 | | 6/2004 | Miyano et al. | |
| 6,986,156 B1 | * | 1/2006 | Rodriguez et al. .............. | 725/95 |
| 7,277,456 B2 | * | 10/2007 | Henry et al. ................... | 370/468 |
| 7,315,985 B1 | * | 1/2008 | Gauvin et al. ................. | 715/734 |
| 7,420,990 B2 | * | 9/2008 | Ching et al. .................... | 370/468 |
| 7,542,474 B2 | * | 6/2009 | Stone et al. .................... | 370/401 |
| 2002/0018477 A1 | * | 2/2002 | Katz ............................. | 370/401 |
| 2004/0103183 A1 | * | 5/2004 | Ku et al. ........................ | 709/223 |
| 2006/0190629 A1 | * | 8/2006 | Kim et al. ......................... | 710/1 |

FOREIGN PATENT DOCUMENTS

| | | |
|---|---|---|
| JP | 2000-13423 A | 1/2000 |
| JP | 2001-503930 A | 3/2001 |
| JP | 2002-305527 A | 10/2002 |
| WO | WO 97/49057 A2 | 12/1997 |

* cited by examiner

*Primary Examiner* — Michael J Moore, Jr.
(74) *Attorney, Agent, or Firm* — Crowell & Moring LLP (57) ABSTRACT

A connected device on an IEEE 1394 serial bus in a network including a data transmission unit that transmits data to a further connected device; a physical connection determining unit that determines physical connection states between connected devices; a logical connection detecting unit that detects all logical connections between the connected devices; a first reduction determining unit that determines whether it is possible to reduce a used bandwidth amount for a certain logical connection by disconnecting a physical connection between connected devices determined to be mutually connected, and by newly connecting connected devices determined to be mutually disconnected; a second reduction determining unit that determines whether it is possible to reduce the used bandwidth amount in the entire network by the physical connection change, to determine candidates of physical connection change for used bandwidth amount reduction; and a display unit that displays a list of the candidates.

6 Claims, 11 Drawing Sheets

CONNECTED DEVICE TO BE CONNECTED TO AN IEEE 1394 SERIAL BUS

BACKGROUND OF THE INVENTION

1. Field of the Invention

The present invention relates to a connected device to be connected to an IEEE (Institute of Electrical and Electronics Engineers) 1394 serial bus (hereafter some times referred to simply as "bus") in network, and more particularly to a technology to reduce the amount of used bandwidth in the entire network.

2. Description of the Related Art

A conventional connected device on a bus needs to acquire network resources, i.e. channel and bandwidth, from an IRM (Isochronous Resource Manager) for sending and receiving isochronous data to and from a further or other devices on the IEEE 1394 serial bus. An IRM is a connected device to manage resources on the bus such as channel and bandwidth. Here, the term "channel" is used to mean a path to pass isochronous data between a sender device and at least one receiver device, while the term "bandwidth" is used to mean bandwidth amount (time) of isochronous communication which is proportional to the size of a packet transmitted on one channel, and is inversely proportional to the transmission speed. Both channel and bandwidth are managed by BANDWIDTH_AVAILABLE (register) (refer to reference numeral 52 in FIG. 2) mapped in a register space.

When one connected device on the bus attempts to establish a new logical connection for sending and receiving isochronous data to and from a further connected device, there may be a case where a bandwidth on the bus is already used for an existing logical connection without leaving a sufficient bandwidth required by the one connected device for the new logical connection. In this case, there is no other way than that the one connected device waits until the bandwidth used for the existing logical connection is released for the new logical connection, if no countermeasure is taken. However, the bandwidth is inversely proportional to the transmission speed as described above. Thus, by changing a physical connection between the then connected devices on the bus, it may be possible to increase the maximum transmission speed at the link-layer level in the then existing and established logical connection, so as to reduce the amount of used bandwidth required for the existing logical connection. If the amount of used bandwidth is reduced, then it may be possible to acquire a bandwidth required for the new logical connection before or without the release of the bandwidth used for the existing and established logical connection.

SUMMARY OF THE INVENTION

An object of the present invention is to provide a connected device which is to be connected to an IEEE 1394 serial bus, and which makes it possible to easily change a physical connection so as to acquire a bandwidth on the bus required by the connected device for a new logical connection, even if a bandwidth on the bus is already used for an existing logical connection without leaving a sufficient bandwidth required by the connected device for the new logical connection, when the connected device on the bus attempts to establish the new logical connection for sending and receiving isochronous data to and from a further connected device.

This object is achieved according to the present invention by a connected device to be connected to an IEEE (Institute of Electrical and Electronics Engineers) 1394 serial bus (hereafter referred to simply as "bus") in network comprising: data transmission means for sending and receiving data to and from a further connected device on the bus; physical connection determining means for determining a physical connection state(s) between connected devices on the bus; logical connection detecting means for detecting all logical connections between the connected devices on the bus; first reduction determining means for determining whether or not it is possible to reduce amount of used bandwidth for a certain logical connection among all the logical connections detected by the logical connection detecting means if a physical connection between connected devices having been determined by the physical connection determining means to be physically connected to each other is disconnected, and if, instead, connected devices having been determined by the physical connection determining means to be physically disconnected from each other are newly physically connected to each other (hereafter referred to as "if physical connection between the connected devices is changed" or simply as "physical connection change"); second reduction determining means for determining whether or not it is possible to reduce amount of used bandwidth in the entire network, which is sum of the used bandwidth for all the logical connections on the bus, as compared to that prior to the physical connection change, if physical connection between the connected devices is changed, so as to determine a candidate(s) of the physical connection change to reduce the amount of used bandwidth in the entire network, when the reduction of the amount of used bandwidth for the certain logical connection is determined by the first reduction determining means to be possible; and display means for displaying a list of the candidate(s) of the physical connection change determined by the second reduction determining means to reduce the amount of used bandwidth in the entire network.

The connected device to be connected to an IEEE 1394 serial bus according to the present invention determines whether or not a physical connection change(s) between connected devices on the bus make(s) it possible to reduce the amount of used bandwidth in the entire network, which is the sum of the amount of used bandwidth for all the logical connections on the bus, as compared to that prior to such physical connection change. Then, a list of information on a physical connection change(s) thus determined to make it possible to reduce the amount of used bandwidth in the entire network is displayed on the display means as connection-change candidates. This makes it possible for a user to reference the connection-change candidates in the list displayed on the display means to easily change a physical connection between connected devices so as to acquire a bandwidth on the bus required for a new logical connection, even if a bandwidth on the bus is already used for an existing logical connection without leaving a sufficient bandwidth required for the new logical connection, when a connected device on the bus attempts to establish the new logical connection for sending and receiving isochronous data to and from a further connected device on the bus.

Preferably, the physical connection determining means determines, based on information in a topology map which is information on connection states between the connected devices on the bus, which devices on the bus are physically connected to each other, and which devices on the bus are disconnected from each other.

Further preferably, the display means displays the list of the candidate(s) of the physical connection change in ascending order of the amount of used bandwidth in the entire network.

Further preferably, it can also be designed so that the connected device further comprises storage means for storing the candidate(s) of the physical connection change in ascending order of the amount of used bandwidth in the entire network, wherein the display means displays the list of the candidate(s) of the physical connection change from the storage means.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

The best mode and preferred embodiments of the present invention will be described hereinafter with reference to the annexed drawings. The present invention relates to a connected device to be connected to an IEEE (Institute of Electrical and Electronics Engineers) 1394 serial bus (hereafter referred to simply as "bus") in network. The following embodiments show examples where the connected device according to the present invention is a bus manager, but the connected device can be devices other than the bus manager. Note that the specific embodiments described are not intended to cover the entire scope of the present invention, and hence the present invention is not limited to only the specific embodiments.

Figure 1:
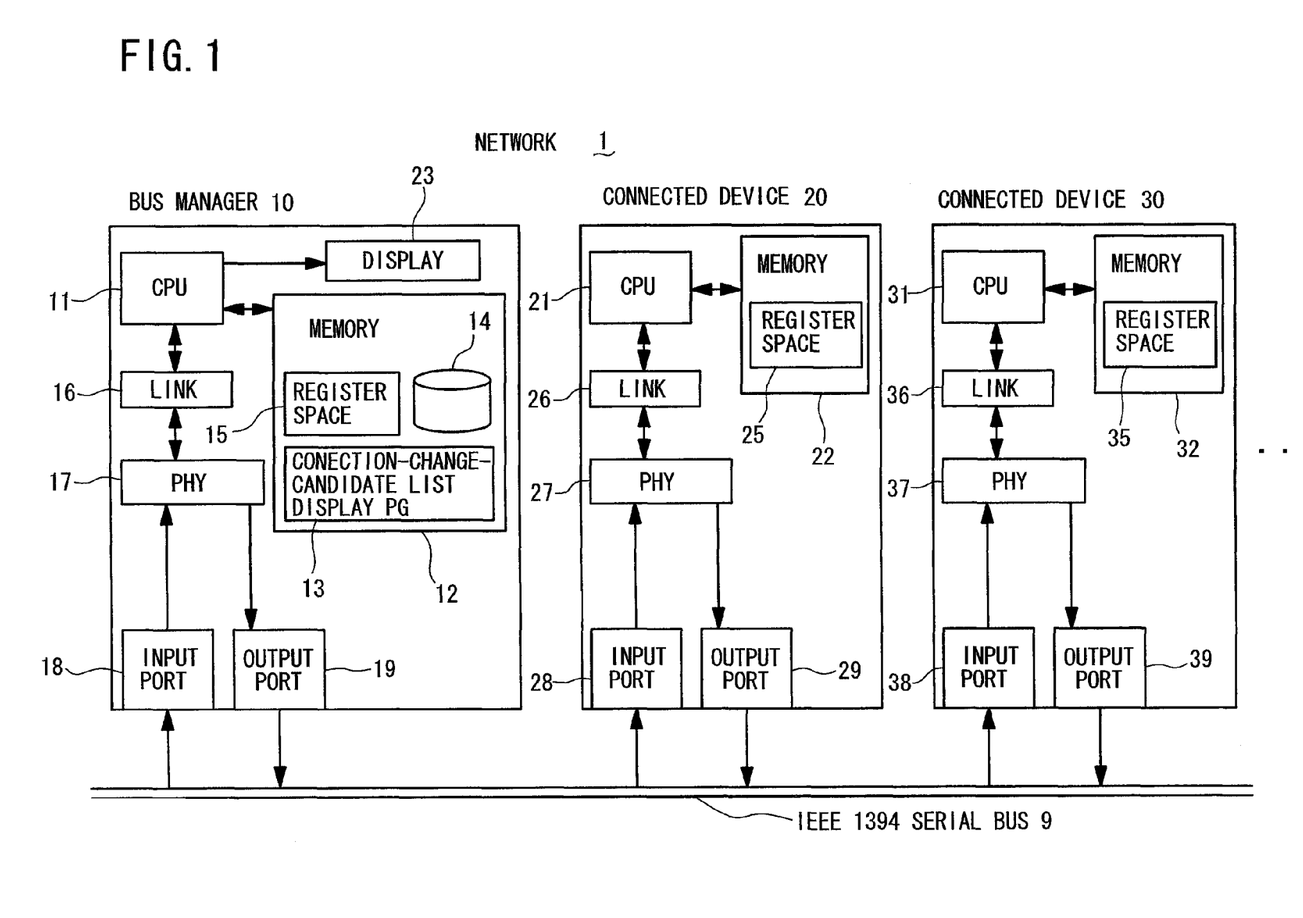
FIG. 1 is a schematic electrical block diagram of a bus manager as a connected device according to an embodiment of the present invention as well as other connected devices on an IEEE 1394 serial bus in network.

FIG. 1 is a schematic electrical block diagram of a bus manager 10 as a connected device according to an embodiment of the present invention as well as other connected devices 20, 30 on an IEEE 1394 serial bus (hereafter referred to simply as "bus") 9 in a network 1. The bus manager 10 provides the connected devices 20, 30 in the network 1 with various bus management functions such as power supply management, data transfer rate management and configuration management. In the following description, the term "node" is used to refer to each of the connected devices 10, 20, 30 connected to the bus 9, while the term "own node" and the term "other nodes" respectively refer to the bus manager 10 and the connected devices 20, 30 other than the bus manager 10.

The bus manager 10 comprises a CPU (Central Processing Unit) 11 for controlling the entire device (bus manager 10), a memory (claimed "storage means") 12 for storing various data, and a display (claimed "display means") 23. The CPU 11 also provides a function of application layer in the IEEE 1394 protocol. The memory 12 contains (stores) a connection-change-candidate list display PG (Program) 13 which is a program to edit and display a later-described connection-change-candidate list screen 90, and which, in combination with the CPU 11, determines whether physical connections between connected devices other than a current physical connection between the connected devices contribute to reduction of amount of used bandwidth in the entire network 1 as compared to that with the current physical connection;

The memory 12 further contains a connection-change-candidate file 14 for storing information of change candidates (hereafter referred to as "connection-change candidates") of physical connections determined by the PG 13 and the CPU 11 to contribute to the reduction of amount of used bandwidth as compared to that with the current physical connection, in which the connection-change-candidate file 14 stores the connection-change candidates in ascending order of the amount of used bandwidth. The combination of the CPU 11 and the connection-change-candidate list display PG 13 corresponds to the claimed "physical connection determining means", "logical connection detecting means" "first reduction determining means" and "second reduction determining means". The memory 12 still further contains a register space 15 storing various information on the own node and the other nodes.

The bus manager 10 further comprises: a LINK 16 to provide services at link layer level in the IEEE 1394 protocol; a PHY 17 to provide services at physical layer level in the IEEE 1394 protocol; and an input port 18 and an output port 19 to connect a cable for the bus 9. The combination of the LINK 16, PHY 17, input port 18 and output port 19 corresponds to the claimed "data transmission means" (data sending/receiving means). Similarly as in the bus manager 10, the connected devices 20, 30 also comprise CPU 21, 31, memories 22, 32 with register spaces 25, 35, LINKs 26, 36, PHYs 27, 37, input ports 28, 38 and output ports 29, 39, respectively. However, in contrast to the bus manager 10, neither of the memories 22, 32 contains a connection-change-candidate list display PG (13) or a connection-change-candidate file (14).

Figure 2:
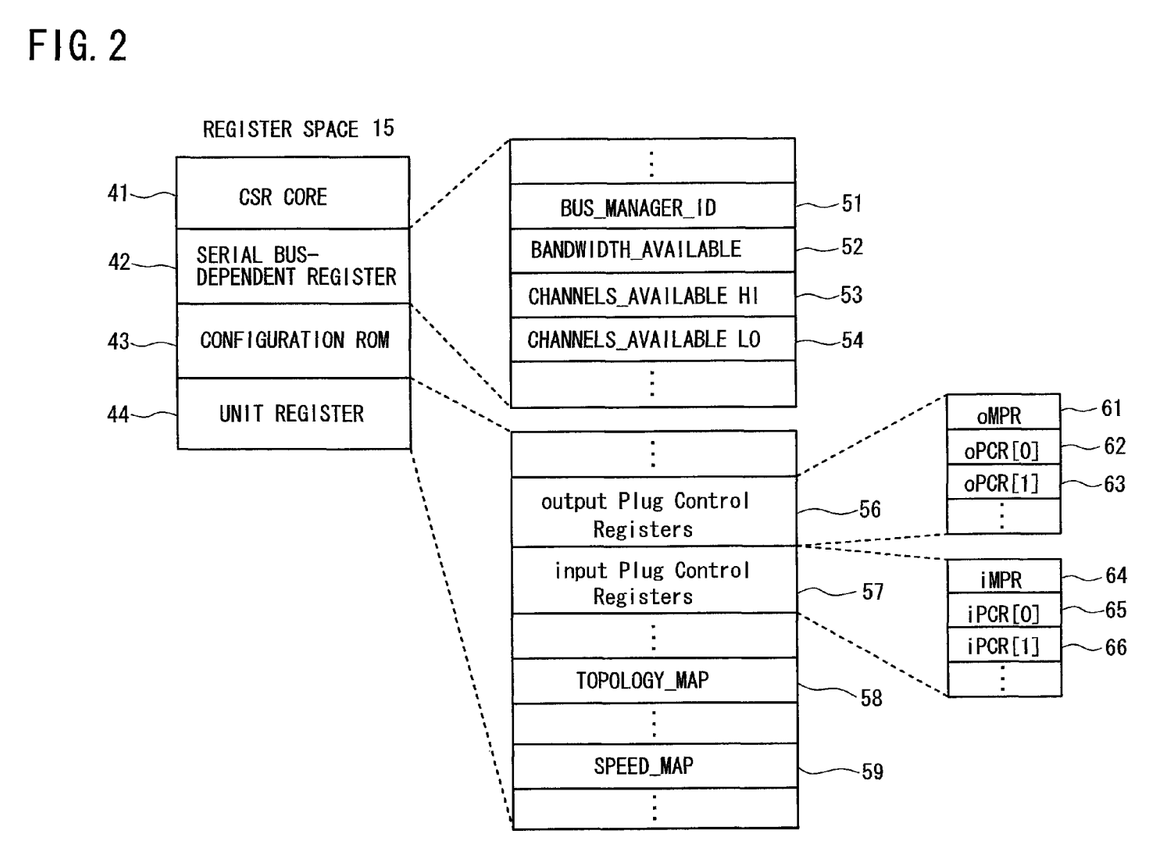
FIG. 2 is a schematic view showing contents of a register space of the bus manager shown in FIG. 1.

Referring now to FIG. 2, which is a schematic view showing contents of the register space 15 of the bus manager 10 shown in FIG. 1, the contents stored in the register space 15 will be described. The register space 15 is formed of a CSR (Control and Status Registers) core 41, a serial bus-dependent register 42, a configuration ROM (Read Only Memory) 43 storing information e.g. on performance of the own node (bus manager 10 itself), and a unit register 44 which is a register specific to each device (bus manager 10). The serial bus-dependent register 42 contains a BUS_MANAGER_ID 51 storing a physical ID (identifier) of the bus manager 10 and a BANDWIDTH_AVAILABLE 52 which is a register for managing bandwidth for synchronous transfer as well as a CHANNELS_AVAILABLE HI 53 and a CHANNELS_AVAILABLE LO 54 which are registers for managing channels for synchronous transfer.

On the other hand, the unit register 44 contains an oPCR (output Plug Control Register) 56 and an iPCR (input Plug Control Register) 57 which are registers for managing connections of connected devices on the data output side and on the data input side, respectively. The oPCR 56 is formed e.g. of an oMPR (output Master Plug Register) 61 for controlling specific attributes of each device (here bus manager 10) as well as oPCR[0] 62, oPCR[1] 63, and so on which are registers corresponding to respective channels. Similarly, the iPCR 57 is formed e.g. of an iMPR (input Master Plug Register) 64 for controlling specific attributes of each device (here bus manager 10) as well as iPCR[0] 65, iPCR[1] 66, and so on which are registers corresponding to respective channels. In addition to the oPCR 56 and the iPCR 57, the unit register 44 contains (stores) a TOPOLYGY_MAP (topology map) 58 which is information on connection states between the respective nodes (connected devices) on the bus 9 as well as a SPEED_MAP 59 which is information on maximum transfer rate at physical layer level between the nodes. Both TOPOLOGY_MAP 58 and SPEED_MAP 59 are created by the CPU 11 at the time of bus reset.

Figure 3:
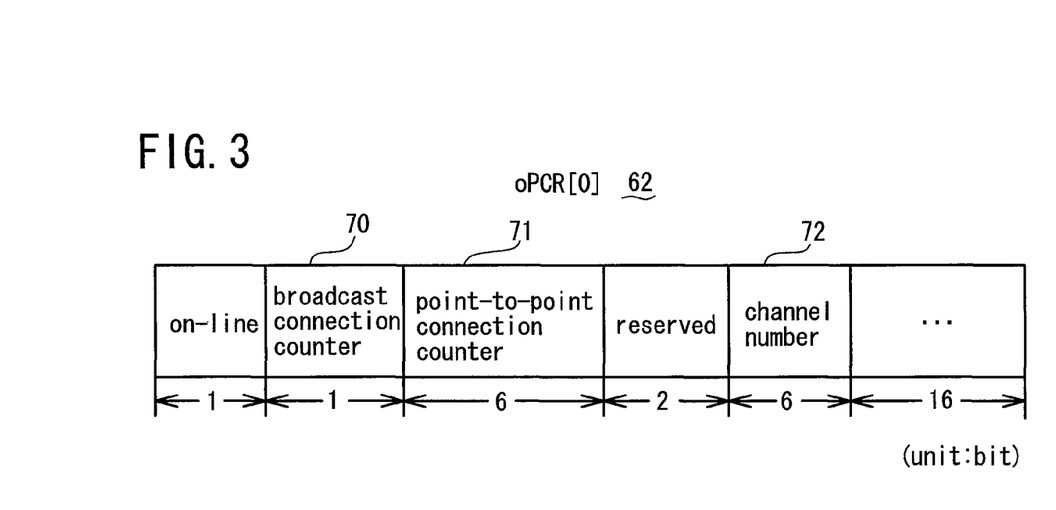
FIG. 3 is a schematic view showing contents of oPCR[0] shown in FIG. 2.
Figure 4:
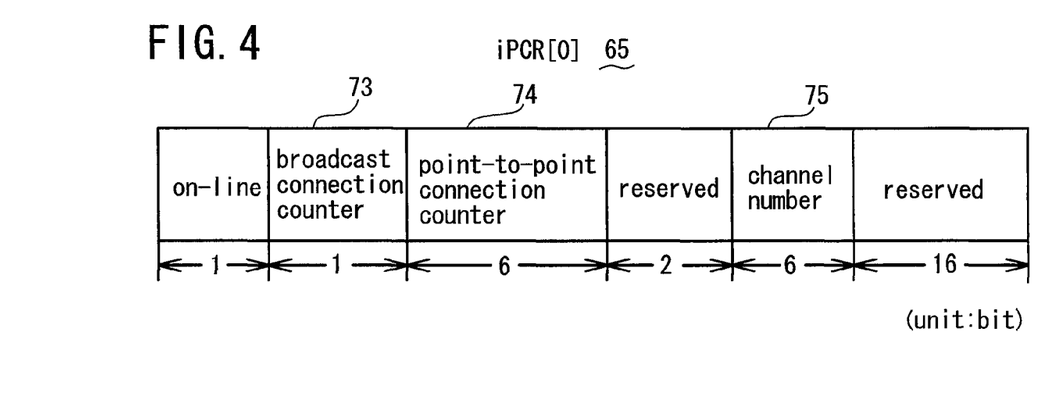
FIG. 4 is a schematic view showing contents of iPCR[0] shown in FIG. 2.

Referring next to FIG. 3 and FIG. 4, which are schematic views showing contents of the oPCR[0] 62 and iPCR[0] 65 shown in FIG. 2, respectively, such contents will be described. As shown in FIG. 3, the oPCR[0] 62 is formed e.g. of: a broadcast connection counter 70 which becomes 1 when data is sent by broadcast connection; a point-to-point connection counter 71 which increments when data is sent by point-to-point connection; a channel number 72 for storing a channel number(s) on the bus 9 which is (are) used for sending data; and so on. Similarly, as shown in FIG. 4, the iPCR[0] 65 is e.g. formed of: a broadcast connection counter 73 which becomes 1 when data is received by broadcast connection; a point-to-point connection counter 74 which increments when data is received by point-to-point connection; a channel number 75 for storing a channel number(s) on the bus 9 which is (are) used for receiving data; and so on.

Figure 5:
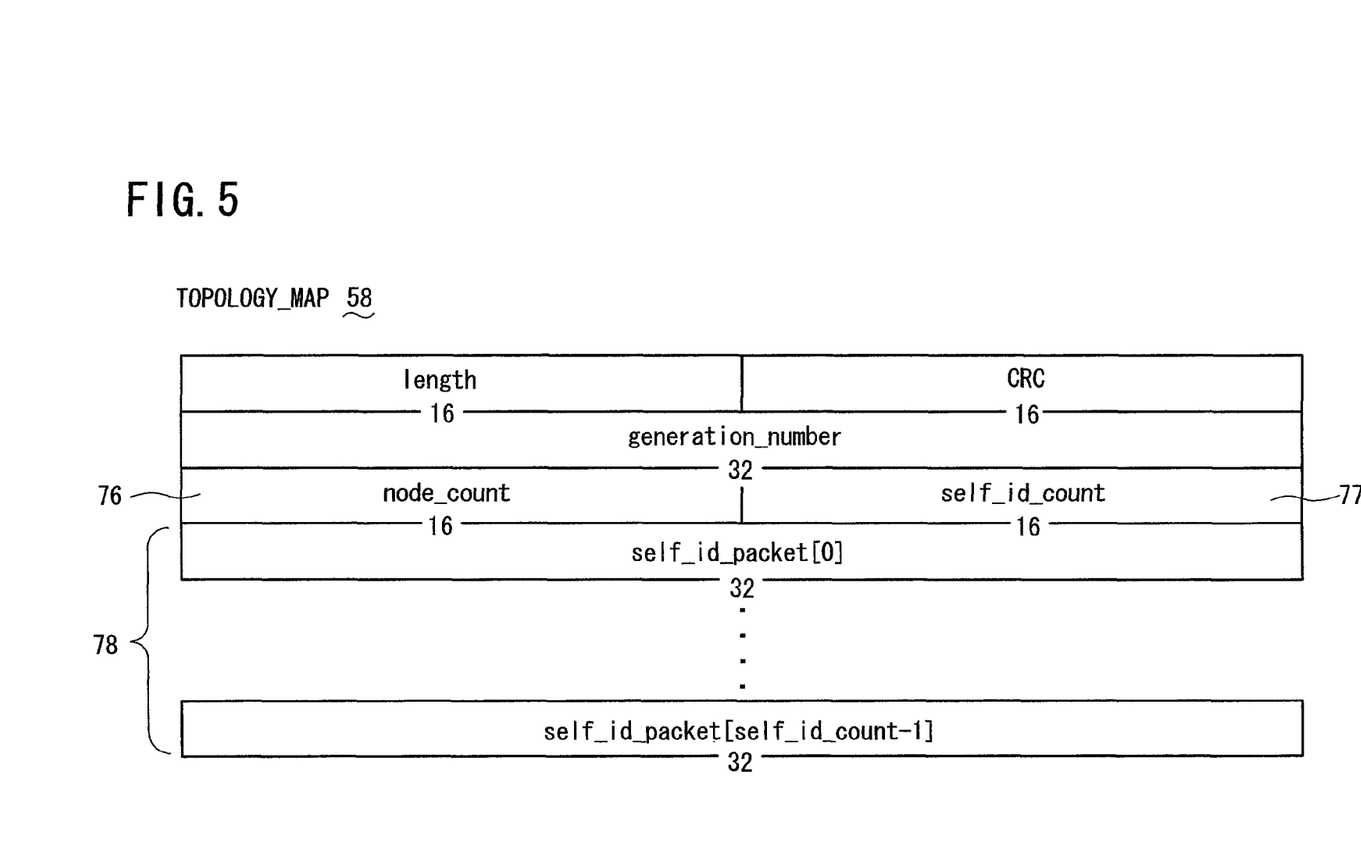
FIG. 5 is a schematic view showing contents of information stored in TOPOLOGY_MAP shown in FIG. 2.

Referring now to FIG. 5, which is a schematic view showing contents of information stored in the TOPOLOGY_MAP 58 shown in FIG. 2, such contents will be described. The TOPOLOGY_MAP 58 is formed of: a node_count 76 which is information on number of nodes on the bus 9; a self_id_count 77 which is information on number of self ID packets stored in the TOPOLOGY_MAP 58; and a self ID packet table 78 containing self ID packets (self_id_packet[0] to self_id_packet[self_id_count−1]) of the respective nodes; and so on. Then referring to FIG. 6, which is a schematic view showing contents of a first kind of self ID packet contained in the self ID packet table 78 shown in FIG. 5 among three kinds of self ID packets contained therein, such contents will be described below.

Figure 6:
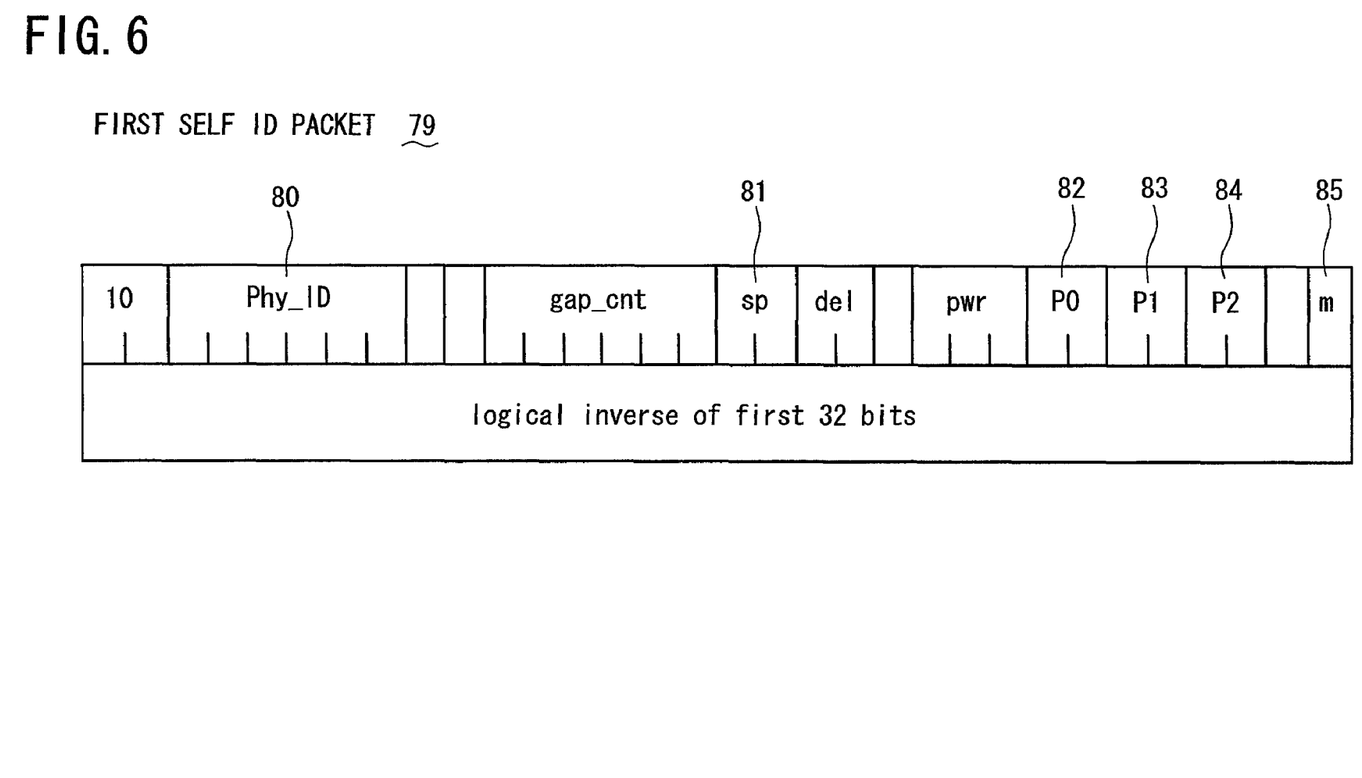
FIG. 6 is a schematic view showing contents of a first self ID packet contained in a self ID packet table shown in FIG. 5.

As shown in FIG. 6, a first kind of self ID packet (hereafter referred to simply as "first self ID packet") 79 stores: a Phy_ID 80 indicating a physical ID of a node (hereafter referred to as "sender node") which has sent out such packet; an sp 81 which is information on the maximum transfer rate at physical layer level of the sender node; p0, p1, p2 information 82, 83, 84 which respectively indicate states of ports p0, p1, p2; m information 85 which indicates presence or absence of an additional packet, more specifically indicating whether there is a subsequent packet having the same physical ID as that of, and following, the first self ID packet 79; and so on.

Each of the p0, p1, p2 information 82, 83, 84 is formed of two binary digits to represent either of "11", "10", "01" and "00", where "11" indicates "such node is currently operating and is connected to a child port", and "10" indicates "such node is currently operating and is connected to a parent port", while "01" indicates "such node is not currently operating", and "00" indicates "no such port (corresponding port) is present". As described above, the self ID packet table 78 shown in FIG. 5 has two kinds of self ID packets other than the first self ID packet 79, which, however, are not further described here, because conventional self ID packets such as those disclosed in Japanese Laid-open Patent Publication 2000-282580 having well-known packet formats can be used therefor.

Figure 7:
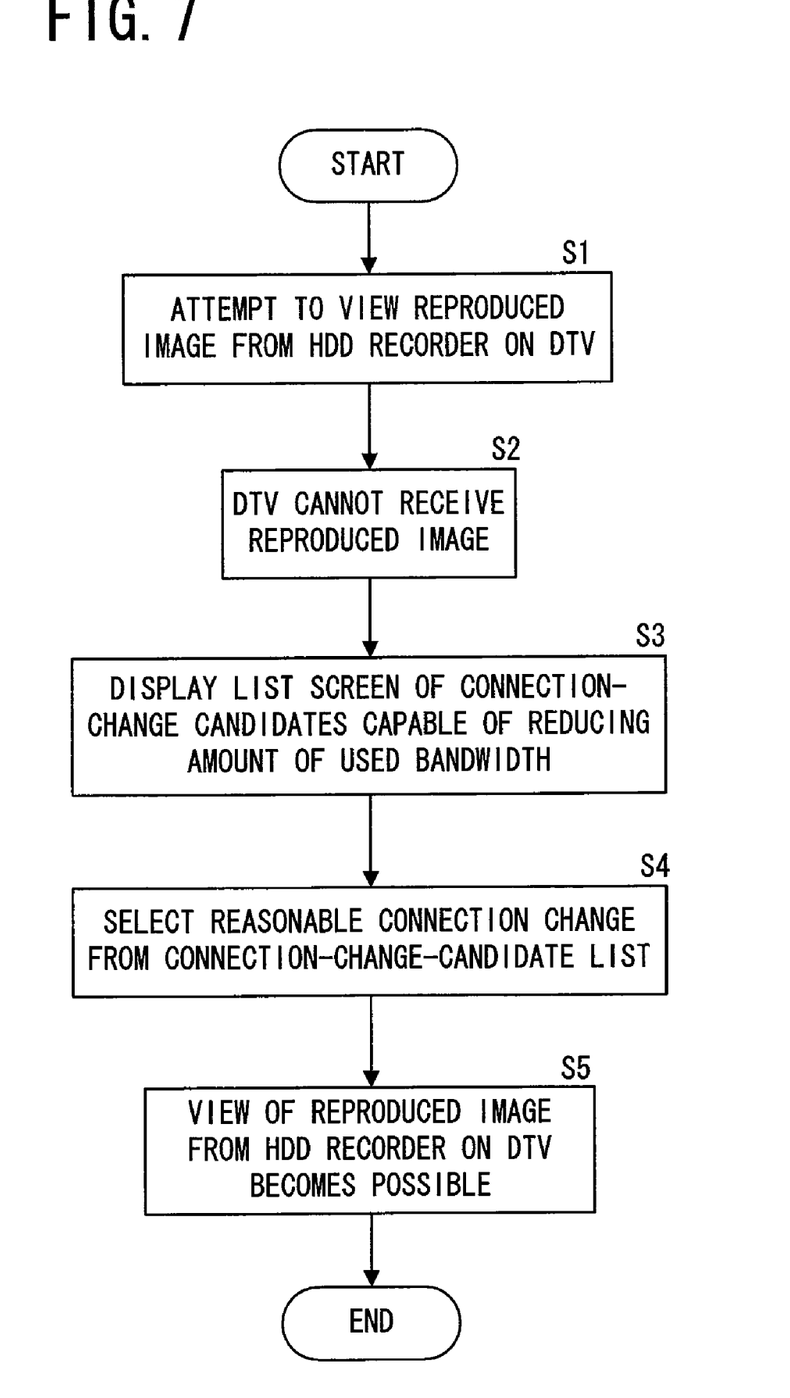
FIG. 7 is a flow chart showing an example of a process of connection change, using a connection-change-candidate list screen.

FIG. 7 is a flow chart showing an example of a process of connection change, using a connection-change-candidate list screen 90. Referring to the flow chart of FIG. 7, the process of connection change as one of the main features of the present invention will be described. First, a user attempts to view a reproduced image from an HDD (Hard Disk Drive) recorder on a DTV (Digital Television) (S1). Here, it is assumed that a bandwidth on the bus 9 is already used for an existing logical connection (e.g. logical connection between a tuner and the DTV) without leaving a sufficient bandwidth required by the DTV for a new logical connection, so that the DTV cannot acquire a bandwidth required for the new logical connection, and thus cannot receive a reproduced image from the HDD recorder (S2). In this case, the user operates the DTV to display thereon a connection-change-candidate list screen 90 (refer to FIG. 8) which is a list screen of connection-change candidates (candidates of new physical connections), indicating a candidate(s) of physical connection(s) between connected devices which make(s) it possible to reduce the amount of used bandwidth in the entire network as compared to the current amount of used bandwidth with a current physical connection (S3).

Figure 8:
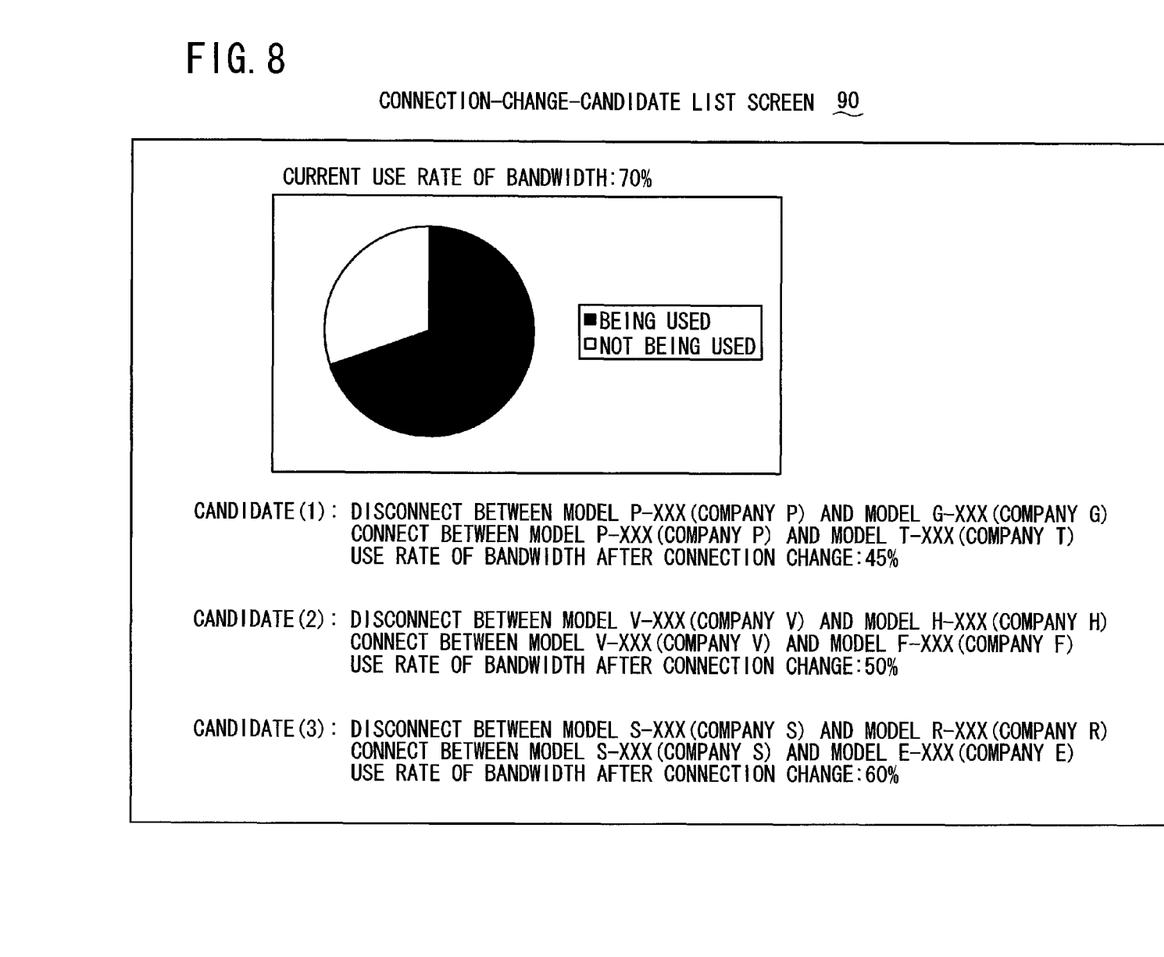
FIG. 8 is a schematic view of a connection-change-candidate list screen.

Using the connection-change-candidate list screen 90, the user can recognize a new physical connection(s) between connected devices to enable reduction of the amount of used bandwidth in the entire network as compared to the current amount with the current physical connection. Thus, from the connection-change candidates (candidates of new physical connections) displayed on the connection-change-candidate list screen 90, the user selects a connection change (new physical connection) among connected devices, which is practically reasonable (or not unreasonable) in view of e.g. bus cable wiring (S4), and changes the bus cable connection to the new connection, thereby changing the physical connection among the connected devices. This change of physical connection makes it possible to reduce the amount of used bandwidth in the entire network 1 without changing the current logical connection among the connected devices on the bus 9, thereby making it possible to acquire bandwidth required for a new logical connection between the DTV and the HDD recorder. Thus, it becomes possible for the DTV to receive a reproduced image from the HDD recorder, so that, in turn, it becomes possible for the user to view a reproduced image from the HDD recorder on the DTV.

Figure 9:
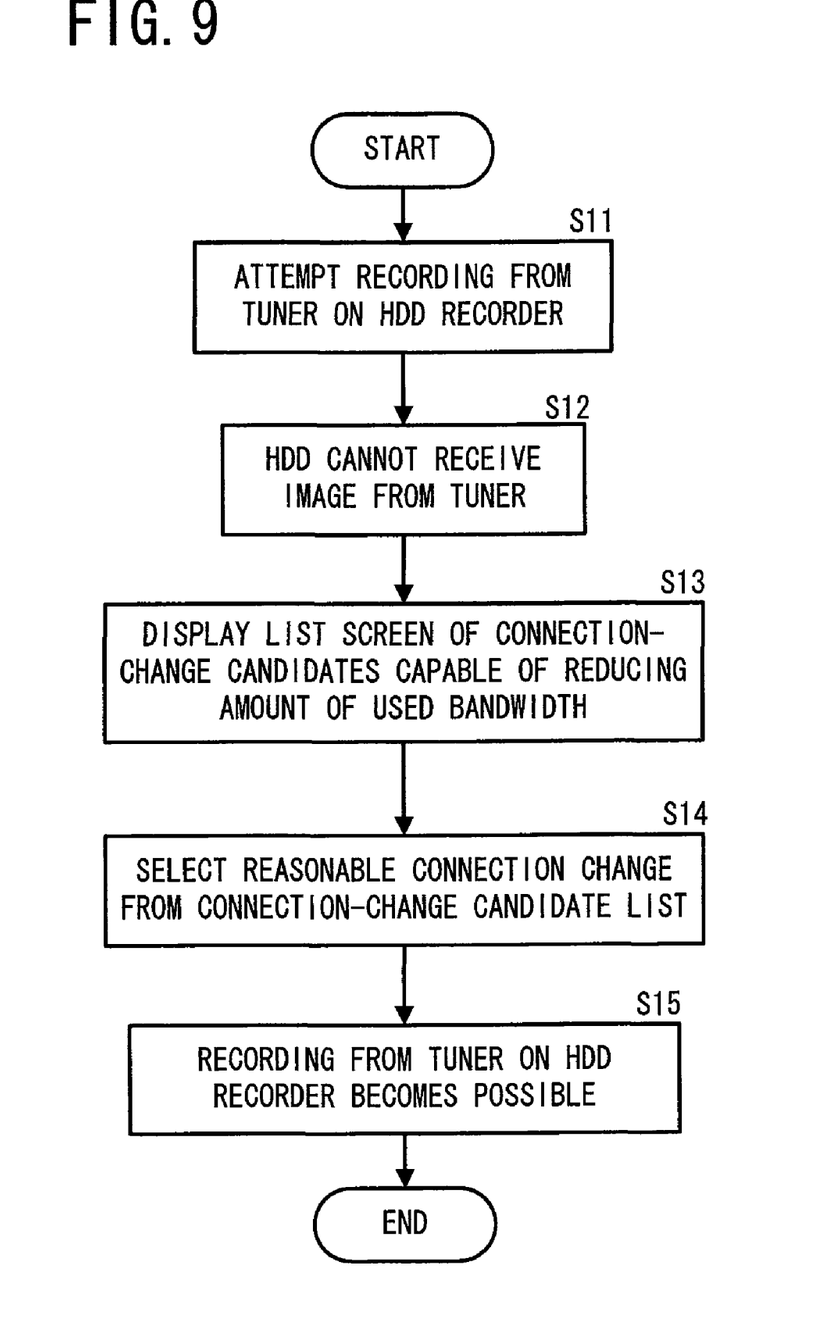
FIG. 9 is a flow chart of a further example of the process of connection change, using the connection-change-candidate list screen.
Figure 10:
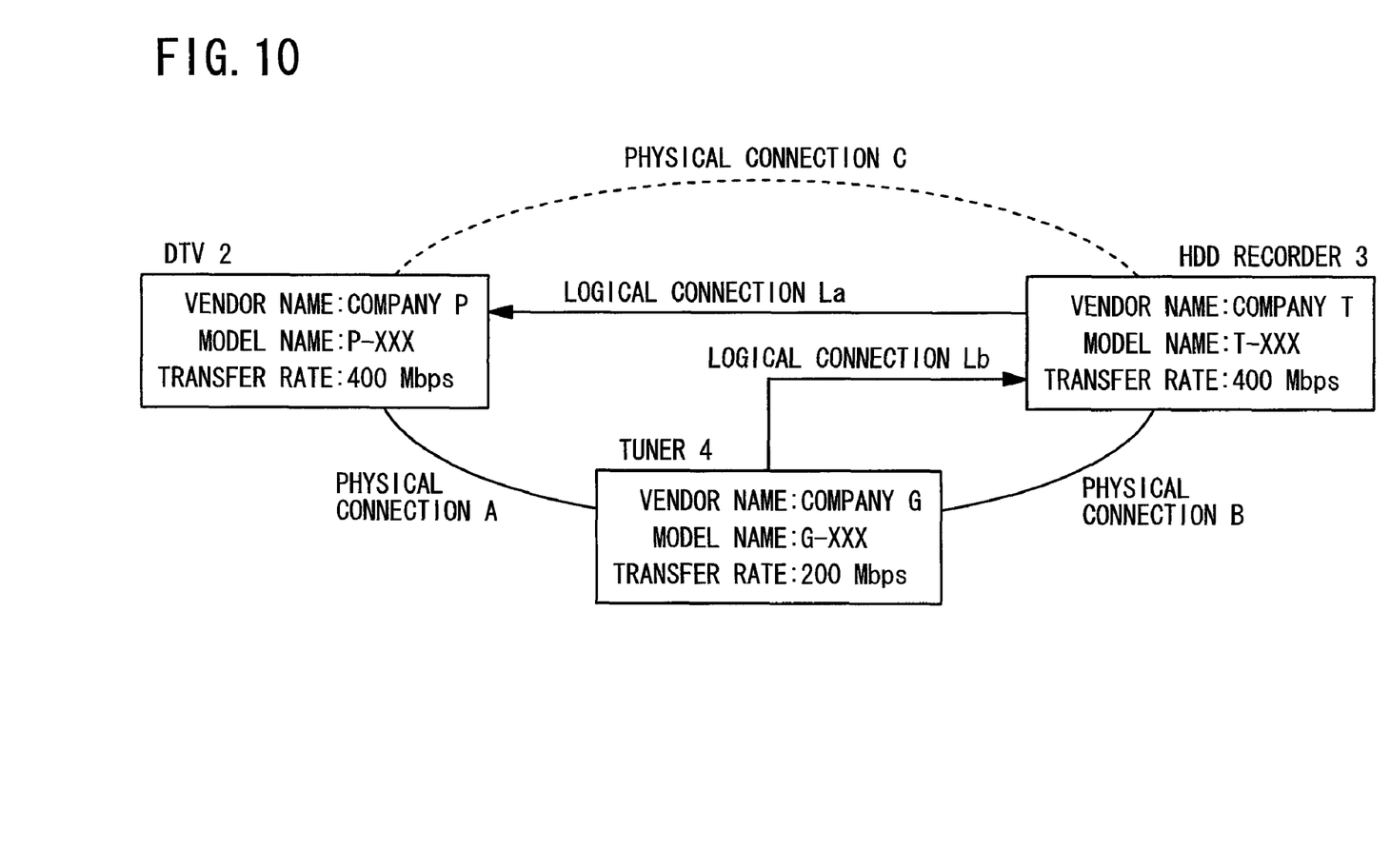
FIG. 10 is a schematic view for explaining the process of connection change.

Referring now to FIG. 8, FIG. 9 and FIG. 10, the following describes in detail a further example of a process of connection change, using a connection-change-candidate list screen 90, to reduce the amount of used bandwidth in the entire network 1. FIG. 8 is a schematic view of a connection-change-candidate list screen 90. FIG. 9 is a flow chart of the further example of the process of connection change, using the connection-change-candidate list screen 90, while FIG. 10 is a schematic view for explaining the process of connection change. First, a user attempts to record an image from a tuner 4 on an HDD recorder 3 (S11). Here, it is assumed that the HDD recorder 3, the tuner 4 and further a DTV 2 are physically connected as shown in FIG. 10, and that a logical connection La is already established between the DTV 2 and the HDD recorder 3. It is further assumed that a bandwidth on the bus 9 is already used for the logical connection La without leaving a sufficient bandwidth required by the tuner 4 for a new logical connection Lb, so that the HDD recorder 3 cannot acquire a bandwidth required for the new logical connection Lb, and thus cannot receive an image from the tuner 4 (S12).

In this case, the user operates the DTV 2 to display thereon a connection-change-candidate list screen 90 (refer to FIG. 8) so as to actually display, on a display thereof, a connection-change-candidate list screen 90, indicating a candidate(s) of physical connection(s) between connected devices which make(s) it possible to reduce the amount of used bandwidth in the entire network as compared to a current amount with a current physical connection (S13). Using the connection-change-candidate list screen 90, the user can recognize a new physical connection(s) between connected devices to enable reduction of the amount of used bandwidth in the entire network as compared to the current amount with the current physical connection. Thus, from the connection-change candidates (candidates of new physical connections) displayed on the connection-change-candidate list screen 90, the user selects a practically reasonable (or not unreasonable) connection change (new physical connection) among connected devices in view of e.g. bus cable wiring (S14), and changes the bus cable connection to the new connection, thereby changing the physical connection of the connected devices.

More specifically, the user selects candidate (1) from the connection-change-candidate list screen 90 shown in FIG. 8 because it achieves a use rate of bandwidth of 45% which is lower than 50% and 60% of those of the other candidates (2) and (3). Thus, the user disconnects physical connection A (refer to FIG. 10) between the DTV 2 of model name P-XXX of company P and the tuner 4 of model name G-XXX of company G and physically connects the DTV 2 of model name P-XXX of company P to the HDD recorder 3 of model name T-XXX of company T, thereby achieving physical connection C (also refer to FIG. 10). This change of physical connection makes it possible to reduce the amount of used bandwidth in the entire network 1 so as to make it possible to acquire bandwidth required for a new logical connection Lb between the tuner 4 and the HDD recorder 3. Thus, it becomes possible for the HDD recorder 3 to receive a reproduced image from the tuner 4, so that, in turn, it becomes possible for the user to record an image from the tuner 4 on the HDD recorder 3 (S15).

Figure 11:
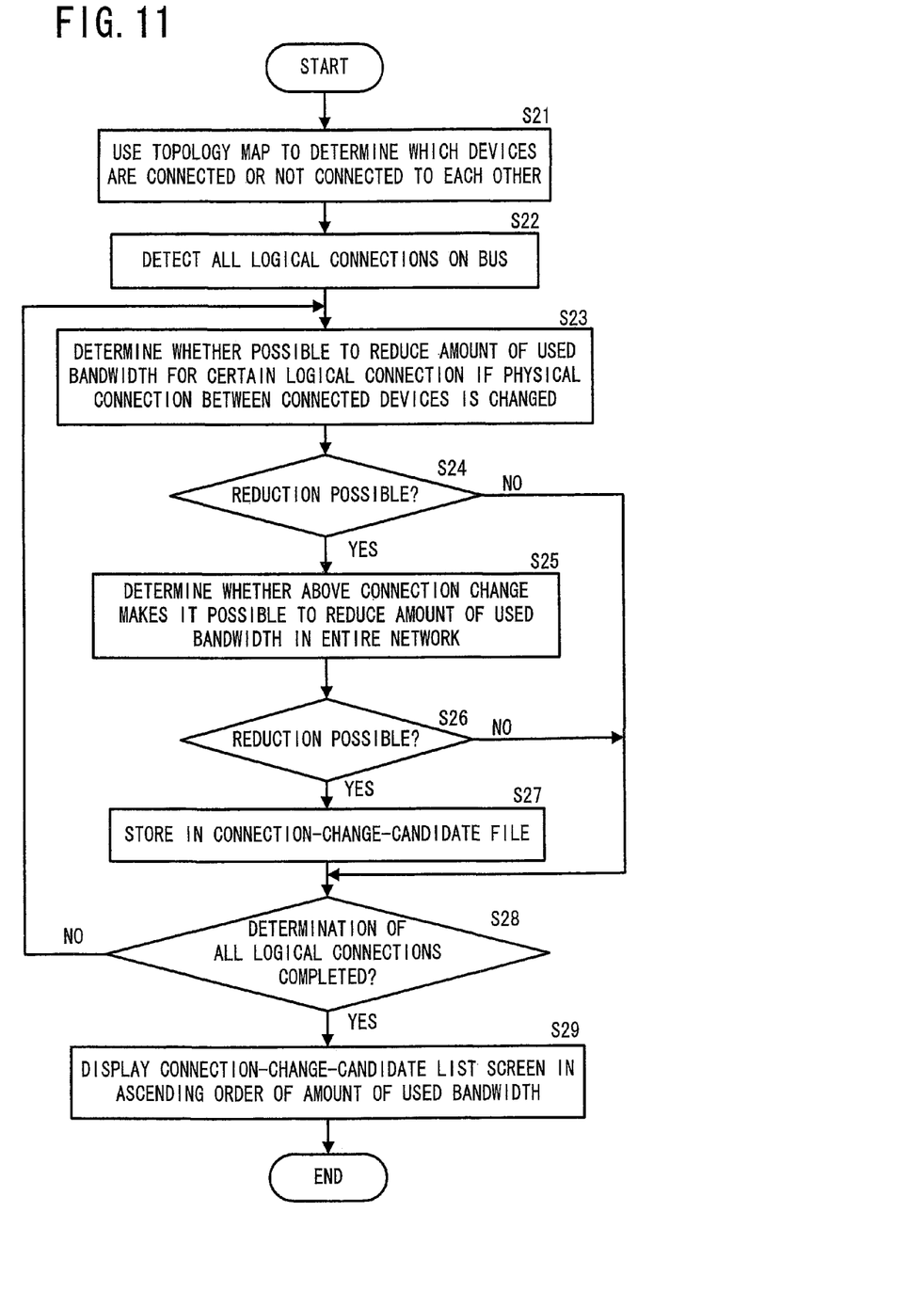
FIG. 11 is a flow chart showing a process of displaying the connection-change-candidate list screen.

FIG. 11 is a flow chart showing a process of displaying the connection-change-candidate list screen 90. Referring to the flow chart of FIG. 11, such display process will be described in detail, assuming that the bus manager 10 is an isochronous resource manager (IRM). When a user operates the bus manager 10 (e.g. above DTV 2) to display the connection-change-candidate list screen 90 (refer to FIG. 8), the CPU 11 of the bus manager 10 determines, based on information in the TOPOLOGY_MAP 58 (e.g. p0, p1, p2 information 82, 83, 84 in first self ID packet 79), which devices on the bus 9 are physically connected to each other, and which devices on the bus 9 are not connected to each other (i.e. disconnected from each other) (S21).

Next, the CPU 11 of the bus manager 10 detects all logical connections between respective connected devices on the bus 9. More specifically, the CPU 11 of the bus manager 10 checks the CHANNELS_AVAILABLE HI 53 and the CHANNELS_AVAILABLE LO 54 (refer to FIG. 2) which are registers for managing channels in the register space 15 of the own node (bus manager 10), so as to detect channels on the bus 9 which are then (currently) used. Further, in order to check a connected device on the sender side (sender node) and a connected device on the receiver side (receiver node) using the detected channels, the CPU 11 of the bus manager 10 reads in contents of the oPCR 56 and the iPCR 57 in the register space 15 of the other connected devices (nodes) 20, 30 on the bus 9, so as to detect all the logical connections between the respective connected devices on the bus 9 (S22).

Thereafter, the CPU 11 of the bus manager 10 determines whether or not it is possible to reduce the amount of used bandwidth for a certain logical connection among all the logical connections detected in the detection step S22, if the physical connection between the connected devices having been determined to be physically connected to each other in the determination step S21 is disconnected, and if, instead, the connected devices having been determined to be disconnected from each other in the determination step S21 are newly physically connected to each other in one way or another (hereafter referred to as "if physical connection between the connected devices is changed" or simply as "physical connection change") (S23). If this determination step S23 determines that it is possible to reduce the amount of used bandwidth for the certain logical connection in one way or another (YES in S24), the CPU 11 of the bus manager 10 then determines whether or not such physical connection change(s) (i.e. candidate or candidates) between connected devices make(s) it possible to reduce the amount of used bandwidth in the entire network 1, which is the sum of the amount of used bandwidth for all the logical connections on the bus 9, as compared to that prior to such physical connection change (S25).

If this determination step S25 determines that it is possible to reduce such amount of used bandwidth in one way or another (YES in S26), the CPU 11 of the bus manager 10 stores information of such physical connection change, i.e. information of a new physical connection(s) or candidate(s) of physical connection(s), between connected devices in the connection-change-candidate file 14 in ascending order of the amount of used bandwidth in the entire network 1 (S27). The CPU 11 of the bus manager 10 performs the determination process of the steps S23 to S27 for each of all the logical connections detected in the detection step S22. If the determination process for each of all the logical connections is completed (S28), the CPU 11 of the bus manager 10 displays a connection-change-candidate list screen 90 on a display 23, showing information on a physical connection change(s) between connected devices in the form of a list of a connection-change candidate(s) or a new physical connection(s) (S29), in which the connection-change candidates in the connection-change-candidate list screen 90 are displayed in ascending order of the amount of used bandwidth in the entire network 1.

Figure 12:
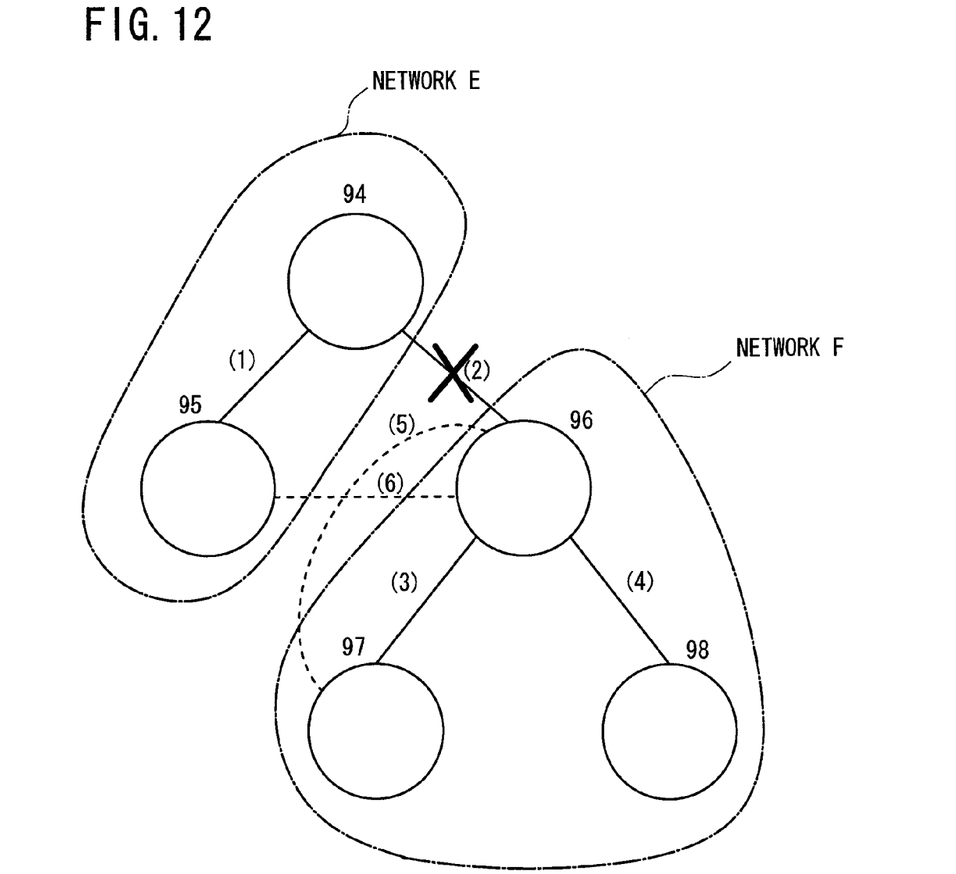
FIG. 12 is a schematic view for explaining a "loop".

Note that in the above determination step S25, the CPU 11 of the bus manager 10 does not list, on the connection-change-candidate list screen 90, a candidate of a physical connection change which causes a so-called "loop" or loop problem, even if the physical connection change may make it possible to reduce the amount of used bandwidth in the entire network 1. FIG. 12 is a schematic view for explaining the "loop". Referring to FIG. 12, an example of physical connection change to cause the "loop" is a connection change made by disconnecting the physical connection shown by a solid line (2) between a connected device 96 and a connected device 94, and by establishing a new physical connection between a connected device 96 and a connected device 97 shown by a dashed curved line (5). When disconnecting the physical connection (2), it is necessary to establish a new proper physical connection (e.g. a physical connection shown by a dashed line (6)) that again connects network E and network F, which are disconnected from each other by the disconnection of the physical connection (2).

As described in the foregoing, the CPU 11 of the bus manager 10 according to the present embodiment determines whether or not a physical connection change(s) between connected devices on the bus 9 make(s) it possible to reduce the amount of used bandwidth in the entire network 1, which is the sum of the amount of used bandwidth for all the logical connections on the bus 9, as compared to that prior to such physical connection change. Then, a list of information on a physical connection change(s), as a connection-change candidate(s), thus determined to make it possible to reduce the amount of used bandwidth in the entire network 1 is displayed on the display 23. Thus, the bus manager 10 makes it possible for a user to reference connection-change candidates in a list displayed on the display 23 to easily change a physical connection between connected devices so as to acquire a bandwidth on the bus 9 required for a new logical connection, even if a bandwidth on the bus 9 is already used for an existing logical connection without leaving a sufficient bandwidth required for the new logical connection, when a connected device on the bus 9 attempts to establish the new logical connection for sending and receiving isochronous data to and from a further connected device on the bus 9.

It is to be noted that the present invention is not limited to the above-described embodiments, and various modifications are possible. For example, although a bus manager is used as an example of the connected device to be connected to an IEEE 1394 serial bus and is operated by a user to display a connection-change-candidate list screen thereon, the connected device according to the present invention to be connected to an IEEE 1394 serial bus is not necessarily or limited to a bus manager.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2006-149656 filed May 30, 2006, the content of which is hereby incorporated by reference.

What is claimed is:

1. A connected device to be connected to an IEEE (Institute of Electrical and Electronics Engineers) 1394 serial bus (hereafter referred to simply as "bus") in a network comprising:
    data transmission means for sending and receiving data to and from a further connected device on the bus;
    physical connection determining means for determining a physical connection state(s) between connected devices on the bus;
    logical connection detecting means for detecting all logical connections between the connected devices on the bus;
    first reduction determining means for determining whether or not it is possible to reduce an amount of used bandwidth for a certain logical connection among all the logical connections detected by the logical connection detecting means if a physical connection between connected devices having been determined by the physical connection determining means to be physically connected to each other is disconnected, and if, instead, connected devices having been determined by the physical connection determining means to be physically disconnected from each other are newly physically connected to each other (hereafter referred to as "if physical connection between the connected devices is changed" or simply as "physical connection change");
    second reduction determining means for determining whether or not it is possible to reduce an amount of used bandwidth in the entire network, which is a sum of the used bandwidth for all the logical connections on the bus, as compared to that prior to the physical connection change, if physical connection between the connected devices is changed, so as to determine a candidate(s) of the physical connection change to reduce the amount of used bandwidth in the entire network, when the reduction of the amount of used bandwidth for the certain logical connection is determined by the first reduction determining means to be possible; and
    display means for displaying a list of the candidate(s) of the physical connection change determined by the second reduction determining means to reduce the amount of used bandwidth in the entire network.

2. The connected device to be connected to an IEEE 1394 serial bus according to claim 1,
    wherein the physical connection determining means determines, based on information in a topology map which is information on connection states between the connected devices on the bus, which devices on the bus are physically connected to each other, and which devices on the bus are disconnected from each other.

3. The connected device to be connected to an IEEE 1394 serial bus according to claim 2,
    wherein the display means displays the list of the candidate(s) of the physical connection change in ascending order of the amount of used bandwidth in the entire network.

4. The connected device to be connected to an IEEE 1394 serial bus according to claim 3,
    which further comprises storage means for storing the candidate(s) of the physical connection change in ascending order of the amount of used bandwidth in the entire network,
    wherein the display means displays the list of the candidate(s) of the physical connection change from the storage means.

5. The connected device to be connected to an IEEE 1394 serial bus according to claim 1,
    wherein the display means displays the list of the candidate(s) of the physical connection change in ascending order of the amount of used bandwidth in the entire network.

6. The connected device to be connected to an IEEE 1394 serial bus according to claim 5,
    which further comprises storage means for storing the candidate(s) of the physical connection change in ascending order of the amount of used bandwidth in the entire network,
    wherein the display means displays the list of the candidate(s) of the physical connection change from the storage means.

* * * * *